US008242939B2

(12) United States Patent
Wennstrom et al.

(10) Patent No.: US 8,242,939 B2
(45) Date of Patent: Aug. 14, 2012

(54) METHOD, APPARATUS AND TERMINAL DEVICE OF SYMBOL INTERLEAVING

(75) Inventors: Mattias Wennstrom, Shenzhen (CN); Branislav Popvic, Guangdong (CN); Yang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 12/642,114

(22) Filed: Dec. 18, 2009

(65) Prior Publication Data

US 2010/0098180 A1 Apr. 22, 2010

Related U.S. Application Data

(63) Continuation of application No. PCT/CN2008/071369, filed on Jun. 19, 2008.

(30) Foreign Application Priority Data

Jun. 19, 2007 (CN) .......................... 2007 1 0127629
Sep. 27, 2007 (CN) .......................... 2007 1 0151724

(51) Int. Cl.
*H03M 7/00* (2006.01)

(52) U.S. Cl. .......................................... 341/81; 341/50

(58) Field of Classification Search .................... 341/81, 341/50; 370/330, 329; 714/777; 711/127
See application file for complete search history.

(56) References Cited

U.S. PATENT DOCUMENTS

| 6,061,386 | A | 5/2000 | Molev-Shteiman | |
|---|---|---|---|---|
| 6,889,335 | B2 * | 5/2005 | Hargis et al. | 713/502 |
| 7,826,415 | B2 * | 11/2010 | Oh et al. | 370/329 |
| 2004/0071172 | A1 | 4/2004 | Beale | |
| 2004/0240378 | A1 * | 12/2004 | Kei Ng et al. | 370/206 |
| 2007/0133462 | A1 * | 6/2007 | Guey | 370/330 |
| 2010/0118800 | A1 * | 5/2010 | Kim et al. | 370/329 |

FOREIGN PATENT DOCUMENTS

| CN | 1630226 A | 6/2005 |
|---|---|---|
| CN | 1694390 A | 9/2005 |
| CN | 1653739 A | 10/2005 |
| EP | 1303051 A1 | 4/2003 |
| WO | 2005/081437 A1 | 9/2005 |

OTHER PUBLICATIONS

First Office Action in corresponding Chinese Application No. 200710151724.6, mailed Jun. 22, 2010.
Written Opinion in corresponding PCT Application No. PCT/CN2008/071369, mailed Oct. 16, 2008.
Extended European Search Report in corresponding European Application No. 08757778.9-2415, mailed May 21, 2010.

(Continued)

*Primary Examiner* — Peguy Jean Pierre
(74) *Attorney, Agent, or Firm* — Leydig, Voit & Mayer, Ltd.

(57) ABSTRACT

A method and an apparatus of symbol interleaving are provided. A sequence S(i) is transformed to generate a symbol interleaving sequence. A numerical value of the sequence S(i) is corresponding to a serial number of a channel element (CE). The symbol interleaving sequence may also be obtained based on a Costas sequence. Therefore, the number of symbol groups in one CE that are mapped to the same physical resource position by different cells is effectively reduced, so that the effect of interference randomization between the cells is improved, the influence of the interference between the cells on the system performance is lowered, and the generation of the symbol interleaving sequence is simplified.

19 Claims, 4 Drawing Sheets

OTHER PUBLICATIONS

"Performances of PDCCH interleaver," 3GPP TSG-RAN WG1 Meeting #51 bis, Document No. R1-080179, Sevilla, Spain, Jan. 14-18, 2008, Source: Huawei.

"CCE to RE mapping," 3GPP TSG RAN WG1 Meeting #49, Document No. R1-072225, Kobe, Japan, May 7-11, 2007, Source: Samsung.

"Mapping of Control Channel Elements to Resource Elements," 3GPP TSG RAN WG1 Meeting #49, Document No. R1-072345, Kobe, Japan, May 7-11, 2007, Source: LG Electronics.

"Mapping of Control Channel Elements to Resource Elements," 3GPP TSG RAN WG1 Meeting #49, Document No. R1-072606, Kobe, Japan, May 7-11, 2007, Source: LG Electronics.

"$3^{rd}$ Generation Partnership Project; Technical Specification Group Radio Access Network; Physical Channels and Modulation (Release 8)," *3GPP*, 3GPP TS 36.211 V1.1.0 (May 2007).

Costas, "A Study of a Class of Detection Waveforms Having Nearly Ideal Range—Doppler Ambiguity Properties," Proceedings of the IEEE, Aug. 1964, vol. 72, No. 8, Institute of Electrical and Electronic Engineers, Valbonne, France.

\* cited by examiner

METHOD, APPARATUS AND TERMINAL DEVICE OF SYMBOL INTERLEAVING

CROSS-REFERENCE TO RELATED APPLICATIONS

This application is a continuation of International Patent Application No. PCT/CN2008/071369, filed Jun. 19, 2008, which claims priority to Chinese Patent Application No. 200710127629.2, filed Jun. 19, 2007 and Chinese Patent Application No. 200710151724.6, filed Sep. 27, 2007, all of which are hereby incorporated by reference in their entireties.

FIELD OF THE TECHNOLOGY

The present invention relates to the field of communications, and more particularly to interleaving technologies in a communication system.

BACKGROUND

In a mobile communication system, signals are often interleaved during signal transmission in order to achieve bit error discretization.

Taking an Orthogonal Frequency Division Multiplexing (OFDM) system for example, information bit packets to be transmitted in each cell are sequentially coded, bit-interleaved, and modulated to obtain multiple modulation symbols, and the obtained multiple modulation symbols are then grouped into multiple symbol groups. The obtained multiple symbol groups are distributed to multiple channels, for example, each channel is corresponding to one or more channel elements (CEs), so that the multiple symbol groups are uniformly distributed to multiple CEs corresponding to different channels. Symbol interleaving is also performed on the multiple symbol groups distributed to the multiple channels, for example, an existing Pruned Bit-Reversal Interleaver (PBRI) is used to re-arrange the multiple symbol groups, and sequentially map the multiple symbol groups after symbol interleaving to corresponding physical resource positions (for example, to corresponding resource elements (REs) in physical downlink control channels (PDCCHs) according to a predefined corresponding relation between the symbol group order and the physical resource positions.

As all the cells perform symbol interleaving with the same interleaving sequence, that is, by using the same interleaving apparatus, the multiple symbol groups after symbol interleaving in each cell are arranged in the same order, so that different cells sharing the same physical resources may map the same symbol groups to the same physical resource position, thereby causing resource collisions. As a result, severe signal interference between the cells and degradation of the transmission performance of the system occur.

In order to solve the above problem, in the conventional art, each cell may also perform cyclic shift on the multiple symbol groups after symbol interleaving according to corresponding cell-specific shift steps, so that the multiple symbol groups after symbol interleaving in different cells sharing the same physical resources are arranged in most possible different orders; and the symbol groups mapped to the same physical resource position are not completely the same, thereby realizing interference randomization between the cells and reducing performance loss caused by interference between the cells.

However, the above method reduces the performance loss due to interference between the cells to some extent, as for the CEs, different cells may map all or a large part of the symbol groups in one or more CEs to the same physical resource position. That is to say, mapping all or a large part of the symbol groups in the same CE or different CEs to the same physical resource position, which causes collisions between the CEs. As a result, great interference between the cells occurs, and the effect of interference randomization is undesirable.

For example, sixteen symbol groups having serial numbers 0 to 15 are provided and distributed to four CEs corresponding to multiple channels. Each CE includes four symbol groups, that is, the symbol groups 0 to 3 belong to CE0, the symbol groups 4 to 7 belong to CE1, the symbol groups 8 to 11 belong to CE2, and the symbol groups 12 to 15 belong to CE3.

Symbol interleaving is performed on the sixteen symbol groups with a PBRI interleaving sequence {0, 8, 4, 12, 2, 10, 6, 14, 1, 9, 5, 13, 3, 11, 7, 15}, and the interleaver is adapted to interleave the total sixteen symbol groups in the four CEs.

It is assumed that the cell-specific cyclic shift steps are 0 and 1; and the two cells may map the symbol groups to corresponding physical resource positions in the following sequences:

Cell_1={0, 8, 4, 12, 2, 10, 6, 14, 1, 9, 5, 13, 3, 11, 7, 15}; and
Cell_2={8, 4, 12, 2, 10, 6, 14, 1, 9, 5, 13, 3, 11, 7, 15, 0}.

That is to say, Cell_1 maps the symbol group 0 and Cell_2 maps the symbol group 8 to the 1st physical resource position, Cell_1 maps the symbol group 8 and Cell_2 maps the symbol group 4 to the 2nd physical resource position, and the rest may be deduced similarly.

The symbol interleaver is mainly adapted to ensure that the number of the symbol groups in one CE that are mapped to the same physical resource position by different cells after symbol interleaving and cyclic shift is reduced, thereby achieving interference randomization.

If the serial numbers of the symbol groups in the above two sequences are replaced by the serial numbers of the CEs that the symbol groups belong to, the following sequences are obtained:

Cell_1={0, 2, 1, 3, 0, 2, 1, 3, 0, 2, 1, 3, 0, 2, 1, 3}; and
Cell_2={2, 1, 3, 0, 2, 1, 3, 0, 2, 1, 3, 0, 2, 1, 3, 0}.

It can be seen from the sequences replaced by serial numbers of the CEs that, Cell_1 maps the symbol groups of CE0 and Cell_2 maps the symbol groups of CE2 to the 1st, 5th, 9th, and 13th physical resource positions, Cell_1 maps the symbol groups of CE2 and Cell_2 maps the symbol groups of CE1 to the 2nd, 6th, 10th, and 14th physical resource positions, and the rest may be deduced similarly. Therefore, Cell_1 and Cell_2 respectively map all the symbol groups in CE0 and CE2 to the same physical resource positions, map all the symbol groups in CE2 and CE1 to the same physical resource positions, map all the symbol groups in CE1 and CE3 to the same physical resource positions, and map all the symbol groups in CE3 and CE0 to the same physical resource positions. Collisions of CE0 with CE2, CE2 with CE1, CE1 with CE3, and CE3 with CE0 may occur between the above two cells, interference randomization between the cells is not achieved, and the transmission performance of the system is also affected.

SUMMARY

The conventional art has at least the following problems: though the existing symbol interleaving technology performs symbol group interleaving and cyclic shift, full collision of the physical resources mapped for the CEs in different cells may still occur. As a result, the interference randomization is not obtained and the system performance will be degraded.

The concept to be used in this disclosure in designing interleaver for the CE to RE mapping is to avoid that symbols from a CE persistently collide with symbols from one and the same CE in a neighboring cell and at the same time maintain good frequency diversity properties.

Accordingly, the present disclosure is directed to a method, apparatus, and terminal device of symbol interleaving, so as to improve the effect of interference randomization between cells.

In an embodiment, the present disclosure provides a method of symbol interleaving, which includes the following steps.

Modulation symbols are divided into several symbol groups, and a symbol group sequence y with a length of M is generated.

Symbol interleaving is performed on the symbol group sequence y according to a symbol interleaving sequence to obtain a sequence w.

The symbol interleaving sequence is generated in the following manner.

A sequence $S(i)$ with a length of M and a value domain of $\{0, 1, \ldots, N-1\}$ is defined.

Elements in the value domain of $S(i)$ are corresponded to N disjoint sequences respectively, and the N disjoint sequences are formed by numerical values from an integer set $\{0, 1, \ldots, M-1\}$.

The numerical values in $S(i)$ are respectively substituted by the numerical values of the corresponding disjoint sequences.

In an embodiment, the present disclosure provides an apparatus for symbol interleaving, which includes: a sequence storage unit, adapted to store a symbol interleaving sequence and a symbol group sequence to be interleaved; and an interleaving processing unit, adapted to perform symbol interleaving on the symbol group sequence according to the symbol interleaving sequence. The symbol interleaving sequence is obtained by transforming a defined sequence $S(i)$. The sequence $S(i)$ has a length of M and a value domain of $\{0, 1, \ldots, N-1\}$. Elements in the value domain of $S(i)$ are corresponded to N disjoint sequences respectively, and the N disjoint sequences are formed by numerical values from an integer set $\{0, 1, \ldots, M-1\}$. The element values in $S(i)$ are respectively substituted by the numerical values of the corresponding disjoint sequences so as to generate the interleaving sequence.

In an embodiment, the present disclosure also provides a terminal device, which includes the apparatus of symbol interleaving.

In an embodiment, the present disclosure provides another method of symbol interleaving, which includes the following steps.

Modulation symbols are divided into several symbol groups.

Symbol interleaving is performed on the symbol groups according to a symbol interleaving sequence.

The symbol interleaving sequence is a Costas sequence or a sequence generated based on a Costas sequence.

In an embodiment, the present disclosure provides another apparatus of symbol interleaving, which includes: a sequence storage unit, adapted to store a symbol interleaving sequence and a symbol group sequence to be interleaved; and an interleaving processing unit, adapted to perform symbol interleaving on the symbol group sequence according to the symbol interleaving sequence.

The symbol interleaving sequence is a Costas sequence, or a sequence generated based on a Costas sequence.

In an embodiment, the present disclosure further provides another terminal device, which includes the apparatus of symbol interleaving.

Compared with conventional art, in the embodiments of the present disclosure, a sequence $S(i)$ is transformed to generate a symbol interleaving sequence, so that the number of symbol groups in one CE that are mapped to the same physical resource position by different cells is effectively reduced by using the generated symbol interleaving sequence, thereby the effect of interference randomization between the cells is improved and the influence of the interference between the cells on the system performance is lowered.

Compared with conventional art, in the embodiments of the present disclosure, a symbol interleaving sequence may also be obtained based on a Costas sequence, so that the number of symbol groups in one CE that are mapped to the same physical resource position by different cells is effectively reduced by using the obtained symbol interleaving sequence, thereby the effect of interference randomization between the cells is improved, the influence of the interference between the cells on the system performance is lowered, and the generation of the symbol interleaving sequence is simplified.

EMBODIMENTS

In an embodiment of the present disclosure, a sequence is defined as $S(i)$. Different element values in the sequence $S(i)$ are corresponding to different element groups, a plurality of elements in $S(i)$ which have the same element value are respectively substituted by the element values in the corresponding element group. And the sequence formed by such substitution serves as a symbol interleaving sequence.

Therefore, if each element group is corresponding to one CE, it is ensured that characteristics of the CE is directly associated with characteristics of the sequence $S(i)$, and $S(i)$ may be regarded as a sequence of interleaving the CE. In this case, if the sequence $S(i)$ has low Hamming correlations, it is ensured that the Hamming correlations between the CEs are as low as possible. The number of the symbol groups in one CE that are mapped to the same physical resource position by different cells is reduced after performing interleaving and cyclic shift on the symbol groups in the CE, thereby the effect of interference randomization between the cells is improved, and the interference between the cells is lowered.

Hamming correlations include: Hamming auto-correlation and Hamming cross-correlation. Hamming auto-correlation of the sequence $S(i)$ indicates a correlation between the original sequence S(i) and a new sequence (S(i+d)mod M) obtained after cyclic shift with a specific step d, i.e. the smaller the number of the same elements in the same position of the new and the original sequence, the lower the correlation. Hamming cross-correlation of S(i) and (S(i)+a)mod N indicates a correlation between the sequence S(i) and a transformed sequence (S((i+d)mod M)+a)mod N. Here, i is a positive integer greater than or equal to 0 while smaller than or equal to M−1, M is the total number of symbol groups in one CE group, d is the shift step adopted by each cell for cyclic shift, d and a are integers greater than or equal to 0, and N is the number of the CEs.

If the Hamming auto-correlation of S(i) is low, the number of the symbol groups in the same CE that are mapped to the same physical resource position by different cells is reduced. If the Hamming cross-correlation between S(i) and (S(i)+a) mod N is low, the number of symbol groups in different CEs (for example, the kth CE in Cell 1 and the ((k+a)mod N)th CE in Cell 2) that are mapped to the same physical resource position by different cells is reduced.

The sequence S(i) may be a Costas sequence, a sequence generated based on the Costas sequence, or another sequence having the same characteristics as the Costas sequence.

Taking an OFDM system for example, the basic principle of getting the symbol interleaving sequence according to the sequence S(i) in various embodiments of the present disclosure is illustrated in the following.

Figure 1:
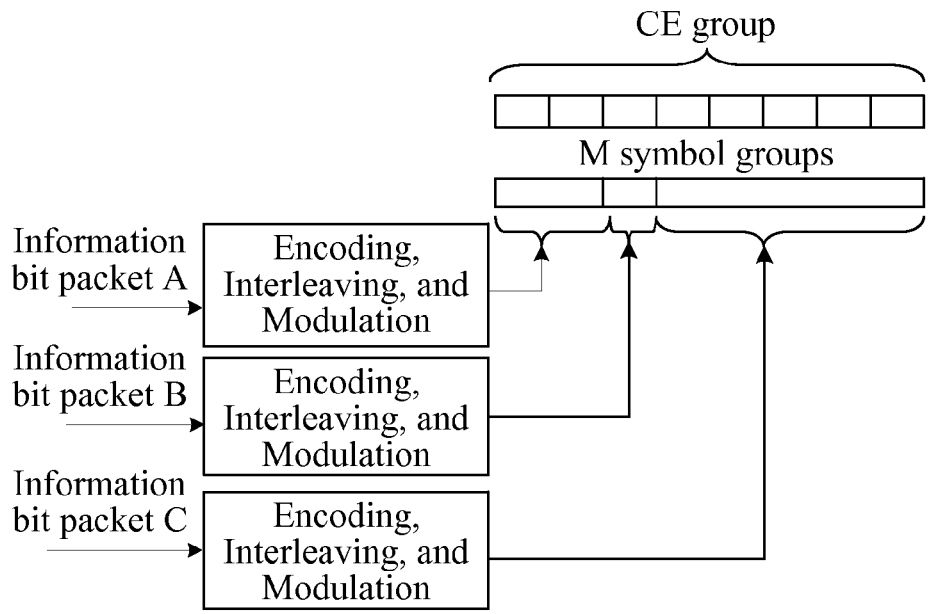
FIG. 1 is a schematic view of a process of generating multiple symbol groups according to an embodiment of the present disclosure.

FIG. 1 is a schematic view of a process of generating multiple symbol groups according to an embodiment of the present disclosure. As shown in FIG. 1, an information bit packet A, an information bit packet B, and an information bit packet C are respectively encoded, interleaved, and modulated to obtain a plurality of modulation symbols. The obtained modulation symbols are then grouped into M symbol groups, and each symbol group has Q symbols.

Figure 2:
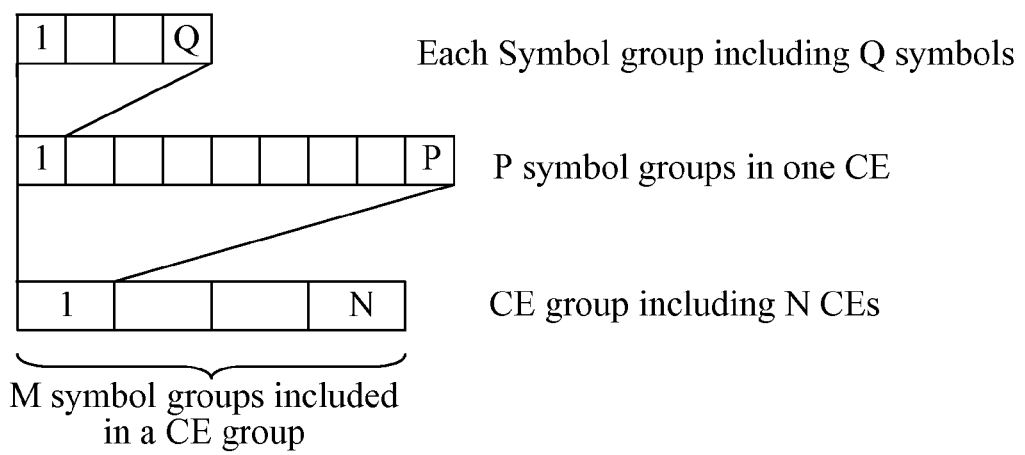
FIG. 2 is a schematic view of a process of distributing modulation symbol groups to CEs according to an embodiment of the present disclosure.

FIG. 2 is a schematic view of a process of distributing the modulation symbol groups to CEs according to an embodiment of the present disclosure. As shown in FIG. 2, the M symbol groups are uniformly distributed to each CE, so that each CE has P symbol groups, that is, M=P×N. N CEs form one CE group; and N CEs have the same length. Optionally, the CEs may have different lengths, and thus include different numbers of symbol groups. Therefore, the number of elements in an element group corresponding to each CE may be defined according to the number of the symbol groups in the CE.

Here, M, N, P, Q are positive integers greater than or equal to 1, and M is greater than or equal to N.

The symbol interleaving is performed on each CE in the CE group, each CE including P symbol groups.

Figure 3:
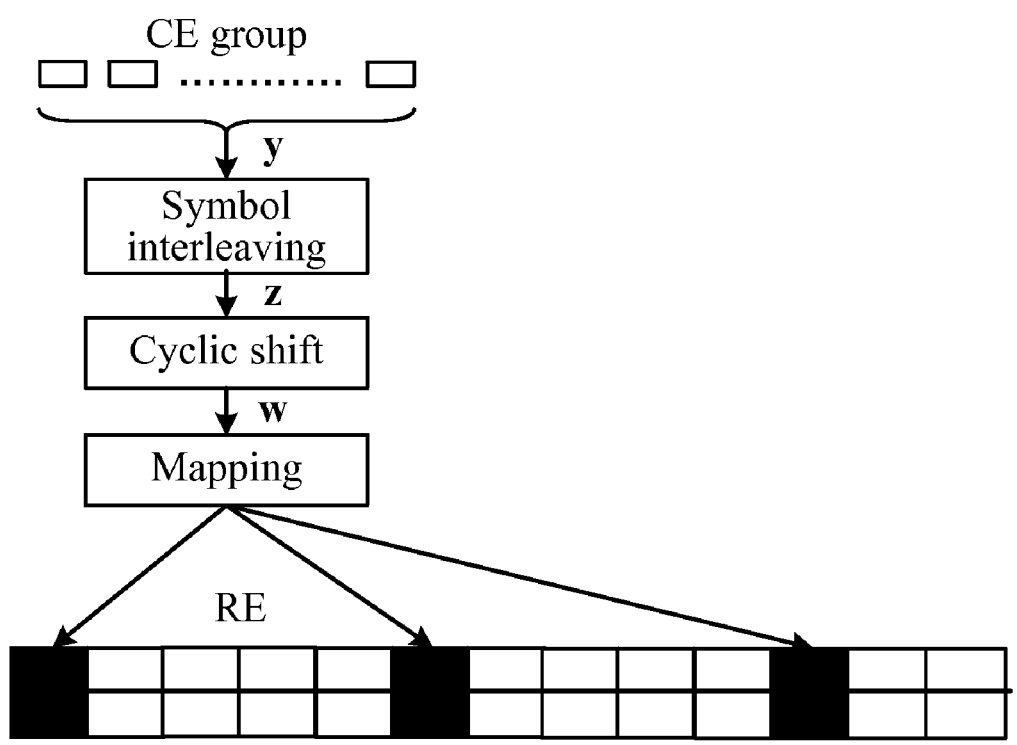
FIG. 3 is a schematic view of a process of symbol interleaving according to an embodiment of the present disclosure.

FIG. 3 is a schematic view of a process of symbol interleaving according to an embodiment of the present disclosure. As shown in FIG. 3, each CE includes P different symbol groups, and N CEs include M symbol groups.

Symbol interleaving is performed on the M symbol groups distributed to the N CEs according to a predefined symbol interleaving sequence I(i). In the M symbol groups, a symbol group y(I(i)) corresponding to a symbol group serial number denoted by the value of the ith element in the symbol interleaving sequence serves as the ith symbol group z(i) after symbol interleaving, thereby changing the order of the M symbol groups. This process may be expressed as: z(i)=y(I(i)), in which i is a positive integer greater than or equal to 0 while smaller than or equal to M−1.

Cyclic shift is performed on the multiple symbol groups after symbol interleaving according to a cell-specific shift step d. That is, the ith symbol group z(i) after symbol interleaving is shifted by d positions to serve as the ith symbol group w(i) after cyclic shift. This process may be expressed as: w(i)=z((i+d)mod M).

Optionally, cyclic shift may be first performed on the symbol interleaving sequence I(i) according to the cell-specific shift step d.

The symbol groups are sequentially mapped to corresponding REs (i.e., black squares in FIG. 3) according to the obtained final order of the M symbol groups based on a predefined corresponding relation between the symbol group order and the physical resource positions.

If M=9 and N=3, a sequence S(i)={0, 1, 2, 1, 0, 2, 0, 2, 1} is defined. The sequence S(i) includes nine elements, with three elements of the same element value denoting the same CE. For example, 0, 1, 2 are respectively corresponding to CE0, CE1, and CE2.

The serial numbers of the nine symbol groups are sequentially 0 to 8, and are uniformly distributed to three CEs. For example, three symbol groups having the serial numbers of 0, 1, and 2 are distributed to CE0, three symbol groups having the serial numbers of 4, 3, and 5 are distributed to CE1, and three symbol groups having the serial numbers of 8, 7, and 6 are distributed to CE2.

0, 1, 2 in the sequence S(i) are respectively replaced by the symbol group serial numbers distributed to CE0, CE1, CE2 corresponding to 0, 1, 2. The symbol interleaving sequence I(i)={0, 4, 8, 3, 1, 7, 2, 6, 5} is obtained.

If the sequence S(i) has low Hamming correlations, the Hamming correlations between any two of following three symbol groups are also very low: the three symbol groups having the serial numbers of 0, 1, 2 distributed to CE0, the three symbol groups having the serial numbers of 4, 3, 5 distributed to CE1, and the three symbol groups having the serial numbers of 8, 7, 6 distributed to CE2. After each cell implements the process in FIG. 3, the Hamming correlations between the same or different CEs are lowered. That is to say, the number of the symbol groups in the same or different CEs that are mapped to the same physical resource position by different cells is reduced.

If different cells are corresponding to different sequences S(i) with low correlations, for example, the correlations between the different sequences S(i) corresponding to the different cells are lower than a predefined threshold, each cell does not need to perform cyclic shift on the symbol groups, and low correlations between the CEs is still ensured. Thus, the number of the symbol groups in one CE that are mapped to the same physical resource position by different cells is reduced. Thereby the effect of interference randomization between the cells is improved, and the interference between the cells is lowered.

Therefore, in order to make sure each element value in the symbol interleaving sequence respectively is equal to the serial number of the symbol group, in this embodiment, the symbol interleaving sequence I(i) configured according to the sequence S(i) satisfies the following condition:

$$S(i) = \left\lfloor \frac{I(i)}{P} \right\rfloor.$$

That is, a result obtained by rounding down a value of dividing the ith element value in the symbol interleaving sequence I(i) by P, or a maximum integer not greater than $$\frac{I(i)}{P},$$

should be equal to the ith element value in the sequence, wherein P is the number of the symbol groups distributed to each CE.

Moreover, the symbol interleaving sequence I(i) configured according to the sequence S(i) also satisfies the following condition:

$$S(i) = \left\lceil \frac{I(i)}{P} \right\rceil.$$

That is, a result obtained by rounding up a value of dividing the ith element value in the symbol interleaving sequence I(i) by P, or a minimum integer not smaller than $$\frac{I(i)}{P}.$$

Next, a method of symbol interleaving according to an embodiment of the present disclosure is illustrated.

Figure 4:
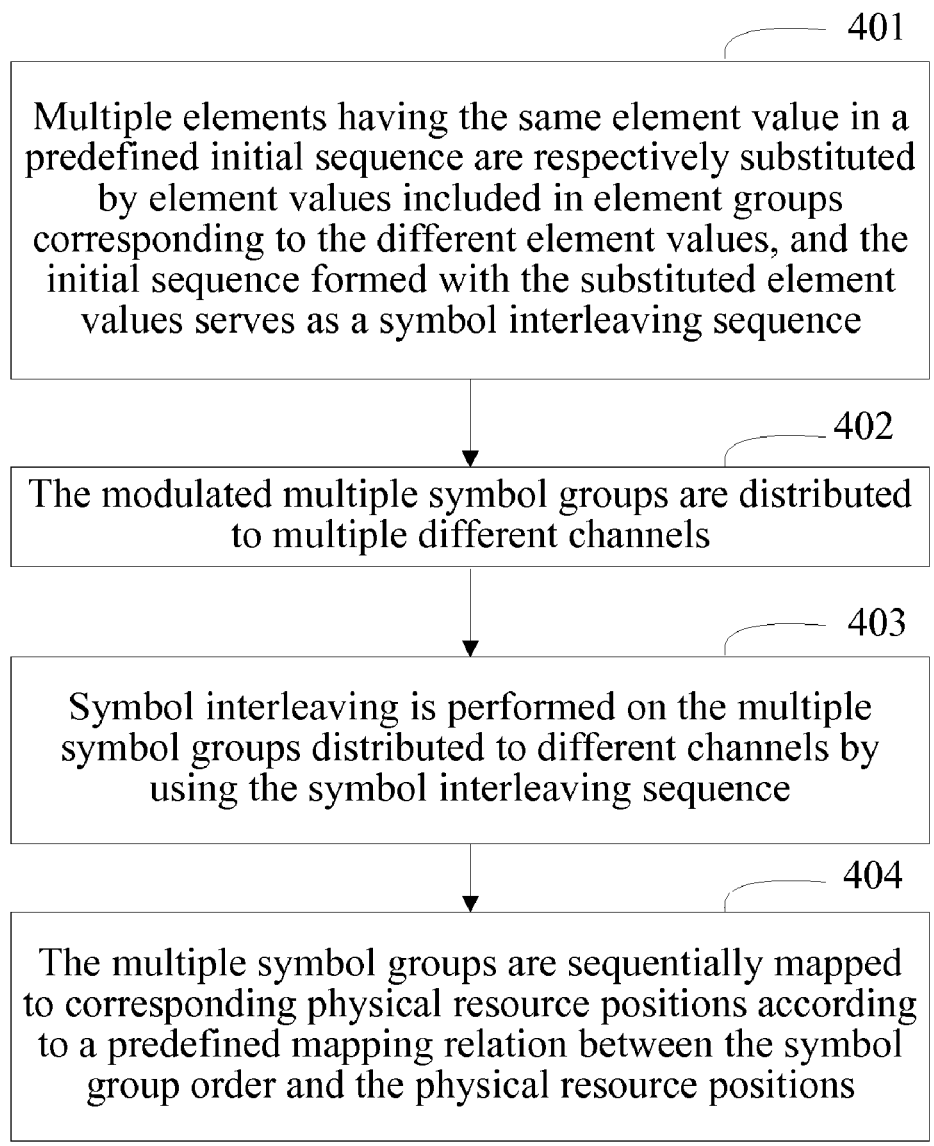
FIG. 4 is a flow chart of a method of symbol interleaving according to an embodiment of the present disclosure.

FIG. 4 is a flow chart of a method of symbol interleaving according to an embodiment of the present disclosure. As shown in FIG. 4, the method of symbol interleaving of this embodiment includes the following blocks.

In Block 401, elements in a value domain set of S(i) are corresponding to N disjoint sequences one by one, and numerical values in S(i) are respectively substituted by numerical values in the corresponding disjoint sequences so as to generate an interleaving sequence.

Different element values in the sequence S(i) are corresponding to different CEs, the N disjoint sequences are corresponding to N CEs one by one, and the values in each disjoint sequence are serial numbers of the symbol groups in the CE corresponding to the disjoint sequence. Serial numbers of symbol group distributed in each CE may be predefined.

The predefined sequence S(i) may be a sequence having Hamming correlations smaller than or equal to a predefined threshold. The Hamming correlations may include: Hamming auto-correlation of S(i), and/or Hamming cross-correlation of S(i) and ((S(i)+a))mod N.

The predefined threshold is obtained according to actual requirements and based on a principle of the small the better. If the Hamming correlations are denoted by a ratio between the number of intersection points of sequences, obtained after performing cyclic shift on two sequences, and the length of the two sequences, the threshold may be set to 0. So that different cells sharing the same physical resources may not map any symbol group in a CE to the same physical resource position. If the threshold is set to be greater than 0 and smaller than 1, the symbol groups that are mapped to the same physical resource position by different cells which shares the same physical resources may be not all from one CE.

In Block 402, the modulated multiple symbol groups are distributed to multiple different channels.

For example, the modulated multiple symbol groups are uniformly distributed to multiple CEs corresponding to different channels.

In Block 403, symbol interleaving is performed on the multiple symbol groups distributed to different channels by using the symbol interleaving sequence to obtain multiple symbol groups interleaved. For example, symbol interleaving is performed on a symbol group sequence y to obtain a sequence w.

After Block 403 and before Block 404, each cell may perform cyclic shift on the multiple symbol groups after symbol interleaving according to a cell-specific shift step. Or before Block 403, each cell performs cyclic shift on the symbol interleaving sequence obtained in Block 401 according to a cell-specific shift step, and then performs symbol interleaving on the multiple symbol groups distributed to different channels by using the cyclic shifted symbol interleaving sequence in Block 403.

In Block 404, the multiple symbol groups are sequentially mapped to corresponding physical resource positions according to a predefined mapping relation between the symbol group order and the physical resource positions.

In this block, preferably, the mapping is first implemented on frequency domain resources and then on time domain resources.

Each cell performs symbol interleaving through the above interleaving method. Therefore, as different element values in the sequence S(i) are corresponding to different element groups, and each element group is corresponding to one CE, it is ensured that characteristics of the CE are directly associated with characteristics of the sequence S(i). Moreover, the sequence S(i) having low Hamming correlations is chosen to ensure that the Hamming correlations between the CEs is as low as possible. So that the number of the symbol groups in one CE that are mapped to the same physical resource position by different cells is reduced. Thereby the effect of interference randomization between the cells is improved, and the interference between the cells is lowered.

Preferably, the sequence S(i) in this embodiment may be a Costas sequence. As the length of a Costas sequence is equal to any prime number minus 1, and different element values in the Costas sequence are corresponding to different CEs, the Hamming correlations between the same CEs or between different CEs are lowered.

Therefore, if a Costas sequence does not satisfy the above condition, and cannot serve as S(i), the Costas sequence may be transformed to generate the sequence S(i) in various manners.

For example, the following method may be adopted to generate S(i), and the present disclosure is not limited thereto.

If the length of the selected Costas sequence is smaller than the required length of the sequence S(i), multiple Costas sequences may be concatenated to obtain the sequence S(i) of this embodiment. Specifically, multiple identical or different complete Costas sequences are directly concatenated into the sequence S(i), in which the length of the sequence S(i) is integral multiples of the length of one Costas sequence, or a sum of the lengths of the multiple different Costas sequences. Or, a complete Costas sequence is concatenated with segments of other Costas sequences; or segments of multiple Costas sequences are concatenated.

If the length of the selected Costas sequence is greater than the required length of the sequence S(i), several elements may be removed from the Costas sequence.

In order to make the element values in the sequence S(i) is equal to the actual serial numbers of the CEs, a modulo operation is performed with respect to N on each element value in the selected Costas sequence or a sequence generated based on the Costas sequence. And a result obtained after the modulo operation on the ith element in the sequence is regarded as the ith element value in the sequence S(i). Afterward, a symbol interleaving sequence I(i) is obtained by transforming the sequence S(i).

In order to make the element values in the sequence S(i) equal to the serial numbers of the CEs, each element value in the sequence S(i) may be set to a maximum integer smaller than or equal to a numerical value obtained by dividing the element by P. The element is at a corresponding position in the Costas sequence or the sequence generated based on the Costas sequence. That is, the ith element value in the sequence S(i) is a maximum integer smaller than or equal to a numerical value obtained by dividing the ith element value in the Costas sequence by P. Alternatively, each element value in the sequence S(i) may be a minimum integer larger than or equal to a numerical value obtained by dividing the element by P. The element is at a corresponding position in the Costas sequence or the sequence generated based on the Costas sequence. That is, the ith element value in the sequence S(i) is a minimum integer larger than or equal to a numerical value obtained by dividing the ith element value in the Costas sequence by P. Afterward, the symbol interleaving sequence I(i) is obtained by transforming the sequence S(i). Moreover, the sequence corresponding to the numerical values in the sequence S(i) may be configured to make the symbol interleaving sequence I(i) obtained through transform to be a Costas sequence, or truncation, and/or perforation and/or, concatenation of a Costas sequence.

Since S(i) may be an existing Costas sequence, and the symbol interleaving sequence I(i) is directly obtained by using the Costas sequence, or formed by a part of elements in the Costas sequence after truncation and/or perforation and/or concatenation. As such, the number of the symbol groups in one CE that are mapped to the same physical resource position by different cells is effectively reduced by using the symbol interleaving sequence. Thereby the effect of interference randomization between the cells is improved, the influence of the interference between the cells on the system performance is lowered, and the technical solution of the embodiment of the present disclosure is simplified by skipping the process of generating the sequence S(i).

Such beneficial effects may also be achieved by making the symbol interleaving sequence as the Costas sequence, which is a special example of the technical solution.

Similarly, if any sequence other than the Costas sequence satisfies $$S(i) = \left\lfloor \frac{I(i)}{P} \right\rfloor \text{ or } S(i) = \left\lceil \frac{I(i)}{P} \right\rceil,$$

and S(i) has low Hamming correlations as described above, the sequence may directly serve as the symbol interleaving sequence I(i).

The Costas sequence is usually obtained through a Welch construction method:

The Costas sequence=$\alpha^k$ mod(M+1), k=0, 1, ..., M−1, where α is a minimum prime number in GF (M+1), and GF refers to the Galois field.

Similarly, if the Costas sequence cannot directly satisfy the required length of the interleaving sequence, the Costas sequence may be truncated and/or perforated (to remove some elements from the sequence) and/or concatenated to obtain a symbol interleaving sequence I(i) with a specific length.

The number of the CEs in a CE group may change dynamically, for example, the number of OFDM symbols in an E-UTRA system for control channel transmission may change with the number of scheduling users, thereby causing dynamic change of the number of the CEs for control channels. Therefore, one cell may need multiple symbol interleaving sequences of different lengths, which are respectively adapted to perform symbol group interleaving on CE groups with different numbers of CEs. That is to say, the length of the symbol interleaving sequence is corresponding to the number of the scheduling users.

In this case, in order to lower the complexity of the implementation of the system, the above method may be adopted to generate a symbol interleaving sequence with a specific length required by the cell. When the number of the CEs changes, operations such as perforation, and/or truncation, and/or concatenation, may be performed on the generated symbol interleaving sequence with the specific length, according to a required length of the symbol interleaving sequence which corresponds to changed number of CEs, so as to change the length of the symbol interleaving sequence, thereby adapting to the changed number of the scheduling users.

For example, if the maximum number of the CEs in a CE group is eight and each CE has nine symbol groups, the maximum length of the symbol interleaving sequence I(i) is 72. The symbol interleaving sequence I(i) with the specific length is obtained by using the Costas sequence with the length of 72, which is shown as follows.

I(i)={0, 4, 24, 51, 40, 58, 2, 14, 1, 9, 49, 30, 8, 44, 5, 29, 3, 19, 26, 61, 17, 16, 11, 59, 7, 39, 53, 50, 35, 33, 23, 46, 15, 6, 34, 28, 71, 67, 47, 20, 31, 13, 69, 57, 70, 62, 22, 41, 63, 27, 66, 68, 42, 68, 52, 45, 10, 54, 55, 60, 12, 64, 32, 18, 21, 36, 38, 48, 25, 56, 65, 37, 43}.

When the number of the CEs in a CE group changes to be six, the required symbol interleaving sequence I'(i) will have a length of 54, so that the original symbol interleaving sequence I(i) with the length of 72 is truncated and/or perforated to reserve 54 random elements while removing the rest of the elements.

The perforation may be implemented in the following manner. The elements having a value greater than 53 are removed from the symbol interleaving sequence I(i), so as to obtain the symbol interleaving sequence I'(i) with a required length, that is, I'(i)={0, 4, 24, 51, 40, 2, 14, 1, 9, 49, 30, 8, 44, 5, 29, 3, 19, 26, 17, 16, 11, 7, 39, 53, 50, 35, 33, 23, 46, 15, 6, 34, 28, 47, 20, 31, 13, 22, 41, 27, 42, 52, 45, 10, 12, 32, 18, 21, 36, 38, 48, 25, 37, 43}, and then symbol interleaving is performed with the symbol interleaving sequence I'(i).

The truncation may be implemented in the following manner. The last element in the symbol interleaving sequence I(i) is substituted by the element having the maximum value in the symbol interleaving sequence I(i), and the last element is then removed. The above process is iteratively performed till the number of the elements in I(i) is reduced to 54, so that I'(i)={0, 46, 24, 20, 40, 13, 2, 16, 1, 18, 49, 41, 8, 27, 5, 42, 3, 52, 26, 10, 17, 39, 11, 12, 7, 32, 53, 21, 35, 38, 23, 25, 15, 33, 34, 43, 28, 4, 47, 51, 31, 36, 6, 14, 37, 9, 22, 30, 50, 44, 48, 29, 45, 19}.

In order to achieve symbol interleaving of different numbers of the CEs, the same Costas sequence may be adopted to generate multiple symbol interleaving sequences with different lengths, and symbol interleaving is performed with the symbol interleaving sequence of the corresponding length in accordance with the current number of the CEs.

The method for symbol interleaving of this embodiment is illustrated above, and an apparatus for symbol interleaving of this embodiment is further described in the following.

Figure 5:
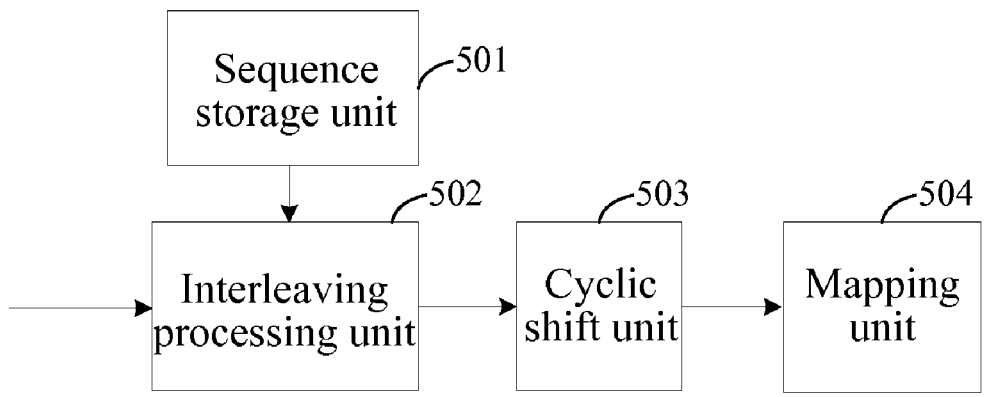
FIG. 5 is a structural view of an apparatus of symbol interleaving according to an embodiment of the present disclosure.

FIG. 5 is a structural view of an apparatus for symbol interleaving 1 according to an embodiment of the present disclosure. As shown in FIG. 5, the apparatus for symbol interleaving 1 of this embodiment includes a sequence storage unit and an interleaving processing unit.

The sequence storage unit is adapted to store a symbol interleaving sequence and one or a plurality of symbol group sequences. The symbol interleaving sequence is obtained by transforming a defined sequence, and in this embodiment, the defined sequence is depicted as S(i) hereinafter. A symbol group sequence is comprised of multiple symbol groups.

Different element values in the sequence S(i) are respectively corresponding to different predefined element groups, and multiple elements having the same element value in the sequence S(i) are respectively substituted by the element values included in the corresponding element groups, so as to obtain the symbol interleaving sequence.

The sequence S(i) may be a sequence having low Hamming correlations, for example, a Costas sequence or a sequence obtained by transforming a Costas sequence.

The interleaving processing unit is adapted to perform symbol interleaving on one or a plurality of symbol group sequences by using the symbol interleaving sequence.

Symbol groups are modulated and distributed to multiple different channels, for example, uniformly distributed to multiple CEs corresponding to different channels.

The apparatus for symbol interleaving 1 of this embodiment may also include a cyclic shift unit and a mapping unit.

The cyclic shift unit is adapted to perform cyclic shift on one or a plurality of symbol group sequences output by the interleaving processing unit according to a predefined cell-specific shift step.

The mapping unit is adapted to map the one or a plurality of symbol group sequences output by the cyclic shift unit to corresponding physical resource positions according to a predefined mapping relation between the symbol group order and the physical resource positions.

Preferably, the mapping is first implemented on frequency domain resources and then on time domain resources.

Figure 6:
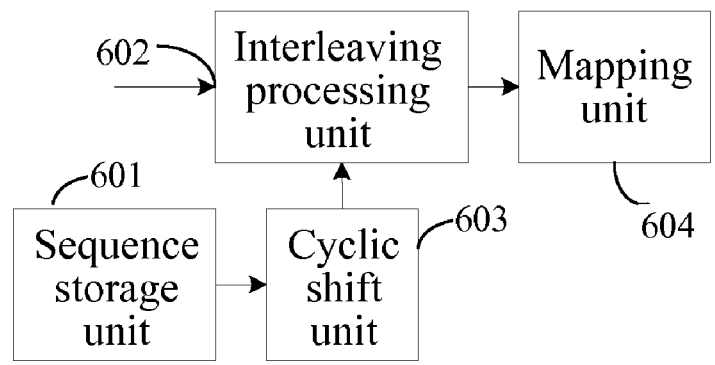
FIG. 6 is a structural view of an apparatus of symbol interleaving according to another embodiment of the present disclosure.

FIG. 6 is a structural view of an apparatus for symbol interleaving 2 according to another embodiment of the present disclosure. As shown in FIG. 6, the apparatus for symbol interleaving 2 of this embodiment includes a sequence storage unit and an interleaving processing unit.

The apparatus for symbol interleaving 2 may also include a cyclic shift unit and a mapping unit.

The main difference between the apparatus for symbol interleaving 2 of this embodiment and the apparatus for symbol interleaving 1 in FIG. 5 lies in the following aspects:

The cyclic shift unit is adapted to perform cyclic shift on the symbol interleaving sequence stored in the sequence storage unit according to a predefined cell-specific shift step.

The interleaving processing unit is adapted to perform symbol interleaving on one or a plurality of symbol group sequences by using the cyclic shifted symbol interleaving sequence.

The mapping unit is adapted to map one or a plurality of symbol group sequences output by the interleaving processing unit to corresponding physical resource positions according to a predefined mapping relation between the symbol group order and the physical resource positions.

Preferably, the mapping is first implemented on frequency domain resources, and then on time domain resources.

Each cell may use the apparatus for symbol interleaving 1 or the apparatus for symbol interleaving 2 for symbol interleaving. Therefore, if each element group is corresponding to one CE, it is ensured that characteristics of the CE is directly associated with characteristics of the initial sequence. In this case, if the initial sequence has low Hamming correlations, it is ensured that the Hamming correlations between the CEs are as low as possible, so that the number of the symbol groups in one CE that are mapped to the same physical resource position by different cells is reduced. Thereby the effect of interference randomization between the cells is improved, and the interference between the cells is lowered.

In the apparatus for symbol interleaving 1 or the apparatus for symbol interleaving 2, if a Costas sequence directly serves as the symbol interleaving sequence I(i) or a part of elements in the Costas sequence are directly adopted to form the symbol interleaving sequence I(i), the number of the symbol groups in one CE that are mapped to the same physical resource position by different cells is effectively reduced by using the symbol interleaving sequence. That is, the symbol interleaving sequence I(i) satisfying $$S(i) = \left\lfloor \frac{I(i)}{P} \right\rfloor \text{ or } S(i) = \left\lceil \frac{I(i)}{P} \right\rceil$$

is ensured to have low Hamming correlations, thereby the effect of interference randomization between the cells is improved, the influence of the interference between the cells on the system performance is lowered, and the technical solution of the embodiment of the present disclosure can be simplified by skipping the process of generating the sequence S(i).

The present disclosure also provides a terminal device, which includes the aforementioned apparatus for interleaving symbols to be processed, so as to improve the effect of interference randomization between cells and lower the influence of the interference between the cells on the system performance. The terminal device may be a user terminal device, a base station (BS), or other terminal devices capable of independently realizing transmitting and receiving functions.

Based on the descriptions of the preceding embodiments, those skilled in the art may understand that the present disclosure may be implemented by hardware only or by software and a necessary universal hardware platform. The technical solution of the present disclosure may be embodied by a software product which may be stored in a nonvolatile storage medium. The storage medium can be a Compact Disk Read-Only Memory (CD-ROM), a USB disk, or a mobile hard disk. The software product includes a number of instructions that enable a computer device (personal computer, server, or network device) to execute the methods provided in the embodiments of the present disclosure.

What is claimed is:

1. A method of symbol interleaving, comprising:
dividing modulation symbols into a plurality of symbol groups;
generating a symbol group sequence y with a length of M, wherein the symbol group sequence comprises the plurality of symbol groups; and
performing the symbol interleaving on the symbol group sequence y according to a symbol interleaving sequence to obtain a sequence w,
wherein the symbol interleaving sequence is a sequence generated by:
defining a sequence S(i) with the length of M and a value domain of $\{0, 1 \ldots N-1\}$; and
respectively substituting element values in the sequence S(i) with the numerical values of corresponding disjoint sequences, wherein each of the disjoint sequences, numbered $\{0, 1, \ldots, N-1\}$, is distributed to the corresponding elements in the sequence S(i), where the N disjoint sequences are formed by numerical values from an integer set {0, 1, ..., M−1}, and Hamming correlations of the sequence S(i) are smaller than or equal to a predefined threshold.

2. The method according to claim 1, wherein the Hamming correlations comprise at least one of the following:
   (a) Hamming auto-correlation of the sequence S(i), and
   (b) Hamming cross-correlation between the sequence S(i) and a sequence (S(i)+a) mod N, wherein i is an integer greater than or equal to 0 while smaller than or equal to M−1, and a is an integer greater than or equal to 0.

3. The method according to claim 1, wherein the sequence S(i) is a Costas sequence or a sequence generated based on the Costas sequence.

4. The method according to claim 3, wherein the sequence S(i) is a sequence generated based on the Costas sequence by: removing a part of elements from the Costas sequence; concatenating multiple identical complete Costas sequences; concatenating a complete Costas sequence with segments of one or more different Costas sequences; or concatenating segments of multiple Costas sequences.

5. The method according to claim 3, wherein each element value in the sequence S(i) is obtained by performing a modulo operation over N by each element in the Costas sequence or by each element in the sequence generated based on the Costas sequence.

6. The method according to claim 3, wherein each element value in the sequence S(i) is a maximum integer smaller than or equal to a numerical value obtained by dividing an element by P, or
   each element value in the sequence S(i) is a minimum integer greater than or equal to the numerical value obtained by dividing the element by P, wherein the element being divided by P is from a corresponding position in the Costas sequence or the sequence generated based on the Costas sequence, P is the number of the symbol groups contained in one channel element.

7. The method according to claim 1, further comprising: mapping symbol groups corresponding to the sequence w to predefined physical resources.

8. The method according to claim 7, wherein cyclic shift is performed on the sequence w according to a predefined cell-specific shift before the mapping.

9. The method according to claim 7, wherein cyclic shift is performed on the symbol interleaving sequence according to a predefined cell-specific shift, and the symbol interleaving is performed on the symbol group sequence y according to the cyclic shifted symbol interleaving sequence before the mapping.

10. The method according to claim 1, wherein the disjoint sequences have a same length.

11. The method according to claim 1, wherein different cells are corresponding to different sequences of the sequence S(i), and correlations between the different sequences of the sequence S(i) are lower than a predefined threshold.

12. The method according to claim 1, wherein element values in the sequence S(i) are corresponding to serial numbers of channel elements.

13. An apparatus of symbol interleaving, comprising:
   a sequence storage unit, adapted to store a symbol interleaving sequence and a symbol group sequence; and
   an interleaving processing unit, adapted to perform the symbol interleaving on the symbol group sequence according to the symbol interleaving sequence the symbol group sequence comprising a plurality of symbol groups, wherein the symbol interleaving sequence is a sequence generated by:
   defining a sequence S(i) with a length of M and a value domain of {0, 1, ..., N−1}; and
   respectively substituting element values in S(i) by the numerical values of corresponding disjoint sequences, wherein each of the disjoint sequences, numbered {0, 1, ..., N−1}, is distributed to the corresponding elements in the sequence S(i), where the N disjoint sequences are formed by numerical values from an integer set {0, 1, ... M−1} and Hamming correlations of the sequence S(i) are smaller than or equal to a predefined threshold.

14. The apparatus according to claim 13, further comprising: a mapping unit, adapted to map interleaved symbol group sequence to corresponding physical resources.

15. The apparatus according to claim 14, further comprising: a cyclic shift unit, adapted to perform cyclic shift on the interleaved symbol group sequence according to a predefined cell-specific shift step, wherein the symbol group sequence to be mapped by the mapping unit is acyclic shifted symbol group sequence.

16. The apparatus according to claim 14, further comprising: a cyclic shift unit, adapted to perform cyclic shift on the symbol interleaving sequence according to a predefined cell-specific shift, wherein the symbol interleaving is performed according to a cyclic shifted symbol interleaving sequence.

17. The apparatus according to claim 13, wherein element values in the sequence S(i) are corresponding to serial numbers of channel elements.

18. A terminal device, comprising the apparatus of symbol interleaving according to claim 13.

19. A base station, comprising the apparatus of symbol interleaving according to claim 13.

* * * * *

UNITED STATES PATENT AND TRADEMARK OFFICE
CERTIFICATE OF CORRECTION

| | |
|---|---|
| PATENT NO. | : 8,242,939 B2 |
| APPLICATION NO. | : 12/642114 |
| DATED | : August 14, 2012 |
| INVENTOR(S) | : Wennstrom et al. |

Page 1 of 1

It is certified that error appears in the above-identified patent and that said Letters Patent is hereby corrected as shown below:

In claim 2, line 5, "on e" should be --one--.

Signed and Sealed this
Fourth Day of December, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,242,939 B2 | Page 1 of 1 |
| APPLICATION NO. | : 12/642114 | |
| DATED | : August 14, 2012 | |
| INVENTOR(S) | : Wennstrom et al. | |

It is certified that error appears in the above-identified patent and that said Letters Patent is hereby corrected as shown below:

Claim 2, column 13, line 5, "on e" should be --one--.

This certificate supersedes the Certificate of Correction issued December 4, 2012.

Signed and Sealed this
First Day of January, 2013

David J. Kappos
*Director of the United States Patent and Trademark Office*